United States Patent
Lu et al.

(10) Patent No.: US 12,247,307 B2
(45) Date of Patent: Mar. 11, 2025

(54) CONFIGURATION FOR ULTRA HIGH PRESSURE ELECTROLYTIC ELUENT GENERATORS

(71) Applicant: Dionex Corporation, Sunnyvale, CA (US)

(72) Inventors: Zhongqing Lu, Fremont, CA (US); Yan Liu, Palo Alto, CA (US); Angelo Rubero, Jr., Sunnyvale, CA (US); Rong Lin, Sunnyvale, CA (US)

(73) Assignee: Dionex Corporation, Sunnyvale, CA (US)

( * ) Notice: Subject to any disclaimer, the term of this patent is extended or adjusted under 35 U.S.C. 154(b) by 536 days.

(21) Appl. No.: 17/565,643

(22) Filed: Dec. 30, 2021

(65) Prior Publication Data
US 2023/0212763 A1     Jul. 6, 2023

(51) Int. Cl.
| | |
|---|---|
| C25B 9/01 | (2021.01) |
| B01D 15/36 | (2006.01) |
| B01D 15/42 | (2006.01) |
| C25B 1/16 | (2006.01) |
| C25B 11/031 | (2021.01) |

(Continued)

(52) U.S. Cl.
CPC .............. *C25B 9/01* (2021.01); *B01D 15/361* (2013.01); *B01D 15/426* (2013.01); *C25B 1/16* (2013.01); *C25B 11/031* (2021.01); *C25B 11/042* (2021.01); *C25B 13/02* (2013.01); *G01N 30/96* (2013.01); *G01N 2030/965* (2013.01)

(58) Field of Classification Search
CPC .... C25B 1/04; C25B 9/00; C25B 9/05; C25B 9/17; C25B 9/19; C25B 9/21; C25B 9/60; C25B 9/70; C25B 9/73; C25B 9/77; C25B 13/02; G01N 30/96; G01N 2030/965; B01D 61/44
See application file for complete search history.

(56) References Cited

U.S. PATENT DOCUMENTS

| | | | |
|---|---|---|---|
| 4,894,128 A | * | 1/1990 | Beaver .................... C25B 13/02 204/252 |
| 6,036,921 A | | 3/2000 | Small et al. |

(Continued)

FOREIGN PATENT DOCUMENTS

| | | | |
|---|---|---|---|
| CN | 109704444 A | | 5/2019 |
| CN | 110389191 A | * | 10/2019 ............. G01N 30/96 |

(Continued)

OTHER PUBLICATIONS

Elkin et al. ("Improvements in ion reflux: An electrodialytic eluent generation and suppression device for ion chromatography." Journal of Chromatography A, 1403 (2015) 63-69) (Year: 2015).*

(Continued)

*Primary Examiner* — Luan V Van
*Assistant Examiner* — Alexander R. Parent (57) ABSTRACT

An electrolytic eluent generator includes an electrolyte reservoir and at least one eluent generation cartridge. The electrolyte reservoir includes a chamber containing an aqueous electrolyte solution; and a first electrode. The at least one eluent generation cartridge includes a platinum mesh electrode; a polymer screen; a plurality of reinforced membranes; a membrane washer; and a spacer including a central post and an annular projection.

18 Claims, 4 Drawing Sheets

(51) Int. Cl.
*C25B 11/042* (2021.01)
*C25B 13/02* (2006.01)
*G01N 30/96* (2006.01)

(56) References Cited

U.S. PATENT DOCUMENTS

| | | | |
|---|---|---|---|
| 6,225,129 | B1 | 5/2001 | Liu et al. |
| 6,315,952 | B1 | 11/2001 | Sklar et al. |
| 6,316,270 | B1 | 11/2001 | Small et al. |
| 6,316,271 | B1 | 11/2001 | Small et al. |
| 6,544,484 | B1 | 4/2003 | Kaufman et al. |
| 6,568,245 | B2 | 5/2003 | Kaufman |
| 6,682,701 | B1 | 1/2004 | Liu et al. |
| 2009/0218238 | A1 | 9/2009 | Dasgupta |
| 2019/0107518 | A1* | 4/2019 | Srinivasan ............. G01N 30/96 |
| 2021/0178334 | A1 | 6/2021 | Lu et al. |
| 2021/0231756 | A1 | 7/2021 | Yang et al. |

FOREIGN PATENT DOCUMENTS

| | | |
|---|---|---|
| EP | 1685887 A1 | 10/2004 |
| JP | 2015223566 A | 12/2015 |
| JP | 2021096259 A | 6/2021 |
| JP | 2021526460 A | 10/2021 |

OTHER PUBLICATIONS

Lu et al. ("Online Gas-Free Electrodialytic KOH Eluent Generator for Ion Chromatography" Anal. Chem. 2018, 90, 12840-12845) (Year: 2018).*

Elkin et al. "Improvements in Ion Reflux: An Electrodialytic Eluent Generation and Suppression Device for Ion Chromatography," Journal of Chromatography A, No. 1403, 2015, pp. 63-69.

Huang et al., "Gradient Nanopump Based Suppressed Ion Chromatography Using Peek Open Tubular Columns" Talanta Open, No. 3, 2021, 11 pages.

Wouters et al. "Ultra-High-Pressure Ion Chromatography with Suppressed Conductivity Detection at 70 MPa Using Columns Packed with 2.5 um Anion-Exchange Particles" Analytical Chemistry, No. 91, 2019, pp. 13824-13830.

Lu Yifei et al: "Online Gas-Free Electrodialytic KOH Eluent Generator for Ion Chromatography", Analytical Chemistry, vol. 90, No. 21, Oct. 2, 2018 (Oct. 2, 2018), pp. 12840-12845.

* cited by examiner

CONFIGURATION FOR ULTRA HIGH PRESSURE ELECTROLYTIC ELUENT GENERATORS

FIELD

The present disclosure generally relates to the field of ion chromatography including ultra-high pressure electrolytic eluent generators (EEGs).

INTRODUCTION

Ion chromatography (IC) is a well-established analytical technique and for the past 40 years or so has been the preferred method for the determination of inorganic anions and small organic anions. IC is also used widely for the determination of inorganic cations, as well as carbohydrates and amino acids.

In ion chromatography, dilute solutions of acids, bases, or salts are commonly used as chromatographic separation eluents. Traditionally, these eluents had been prepared off-line by dilution with reagent-grade chemicals. Off-line preparation of chromatographic eluents can be tedious and prone to operator errors, and often introduces contaminants. For example, dilute NaOH solutions, widely used as eluents in the ion chromatographic separation of anions, are easily contaminated by carbonate. The preparation of carbonate-free NaOH eluents is difficult because carbonate can be introduced as an impurity from the reagents or by adsorption of carbon dioxide from air. The presence of carbonate in NaOH eluents can compromise the performance of an ion chromatographic method and can cause an undesirable chromatographic baseline drift during the hydroxide gradient and even irreproducible retention times of target analytes. In recent years, several approaches that utilize the electrolysis of water and charge-selective electromigration of ions through ion-exchange media have been investigated by researchers to purify or generate high-purity ion chromatographic eluents. U.S. Pat. Nos. 6,036,921, 6,225,129, 6,316,271, 6,316,270, 6,315,954, and 6,682,701 describe electrolytic devices that can be used to generate high purity acid and base solutions by using water as the carrier. Using these devices, high purity, contaminant-free acid or base solutions are automatically generated in-line for use as eluents in chromatographic separations.

With the introduction of electrolytic devices for on-line generation of pure eluents, ion chromatography was empowered to advance into a new era. It has since grown at a fast pace due to advantages of using EEGs over the conventional method of manual preparations (such as high purity eluents, excellent concentration reproducibility through precise control of a constant current, ease of use, etc.). Electrolytically generated eluents have been widely used in many areas ranging from environmental protection, biotechnology, pharmaceutical industries, power plants, and food industries, etc.

As ion chromatography evolves to utilize separation columns with smaller diameters and smaller bead sizes in the realm of Ultra High Performance Liquid Chromatography (UHPLC), the operating pressure required for the EEGs has increased. As such, there is a need for improved EEGs.

SUMMARY

In a first aspect, an eluent generation cartridge can include a platinum mesh electrode; a polymer screen; a plurality of reinforced membranes; a membrane washer; and a spacer including a central post and an annular projection.

In various embodiment of the first aspect, the eluent generation cartridge can be configured to operate at a pressure of at least about 5,000 psi, such as at least about 10,000 psi. In particular embodiments, the eluent generation cartridge can be configured to operate at a pressure of not greater than about 30,000 psi, such as not greater than about 15,000 psi.

In various embodiment of the first aspect, the plurality of reinforced membranes includes at least about 5 ion exchange membranes, such as not more than about 100 ion exchange membranes.

In various embodiment of the first aspect, wherein the membrane washer includes at least one ion exchange membranes, such as not more than about 20 ion exchange membranes.

In a second aspect, an electrolytic eluent generator can include an electrolyte reservoir and at least one eluent generation cartridge. The electrolyte reservoir can include a chamber containing an aqueous electrolyte solution and a first electrode. The at least one eluent generation cartridge can include a platinum mesh electrode; a polymer screen; a plurality of reinforced membranes; a membrane washer; and a spacer including a central post and an annular projection.

In various embodiment of the second aspect, the eluent generation cartridge can be configured to operate at a pressure of at least about 5,000 psi, such as at least about 10,000 psi. In particular embodiments, the eluent generation cartridge can be configured to operate at a pressure of not greater than about 30,000 psi, such as not greater than about 15,000 psi.

In various embodiment of the second aspect, the aqueous electrolyte solution includes potassium hydroxide or sodium hydroxide.

In various embodiment of the second aspect, the aqueous electrolyte solution includes methanesulfonic acid.

In various embodiment of the second aspect, the plurality of reinforced membranes includes at least about 5 ion exchange membranes, such as not more than about 100 ion exchange membranes.

In various embodiment of the second aspect, wherein the membrane washer includes at least one ion exchange membranes, such as not more than about 20 ion exchange membranes.

DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of ultra high pressure EEGs are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Chromatography System

Figure 1:
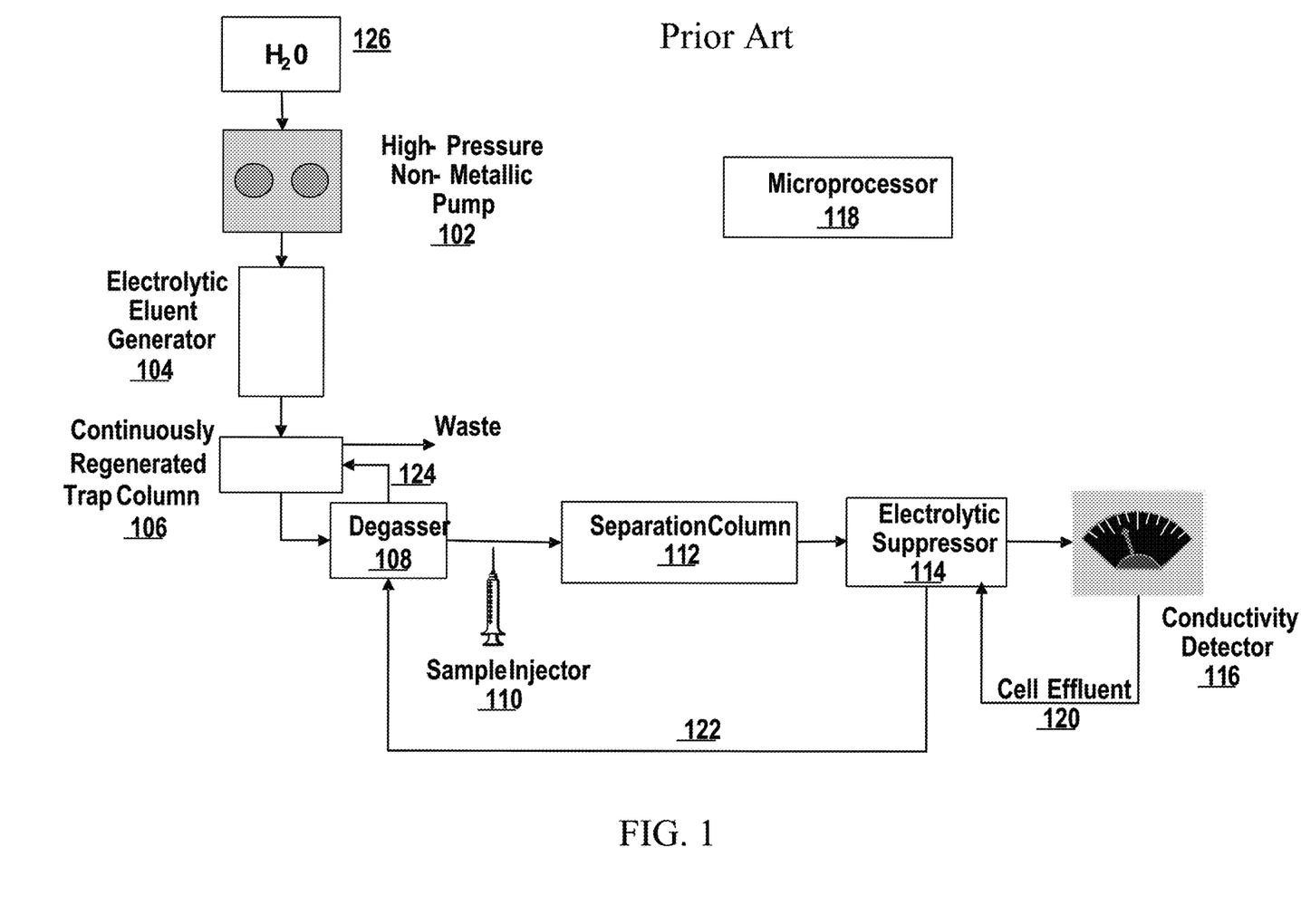
FIG. 1 illustrates a chromatography system that includes an eluent generator, in accordance with various embodiments.

FIG. 1 illustrates an embodiment of a chromatography system 100. Chromatography system 100 may include a pump 102, an electrolytic eluent generator 104, a continuously regenerated trap column 106, a degasser 108, a sample injector 110, a chromatographic separation column 112, an electrolytic suppressor 114, a detector 116, and a microprocessor 118. Chromatographic separation column 112 may be in the form of a capillary column or an analytical column. A recycle line 120 may be used to transfer the liquid from an output of detector 116 to an inlet of the electrolytic suppressor 114, recycle line 122 may be used to transfer liquid from an outlet of electrolytic suppressor 114 to an inlet of degasser 108, and recycle line 124 may be used to transfer liquid from an outlet of degasser 108 to an inlet of continuously regenerated trap column 106.

Pump 102 can be configured to pump a liquid from a liquid source 126 and be fluidically connected to electrolytic eluent generator 104. In an embodiment, the liquid may be deionized water, an aqueous solution with electrolyte(s), or a mixture of an organic solvent with deionized water or with aqueous electrolyte(s) solution. A few example electrolytes are sodium acetate and acetic acid. The eluent mixture that contains an organic solvent may include a water miscible organic solvent such as, for example, methanol. Pump 102 can be configured to transport the liquid at a pressure ranging from about 20 PSI to about 15,000 PSI. Under certain circumstances, pressures greater than 15,000 PSI may also be implemented. It should be noted that the pressures denoted herein are listed relative to an ambient pressure (13.7 PSI to 15.2 PSI). Pump 102 may be in the form of a high-pressure liquid chromatography (HPLC) pump. In addition, pump 102 can also be configured so that the liquid only touches an inert portion of pump 102 so that a significant amount of impurities does not leach out. In this context, significant means an amount of impurities that would interfere with the intended measurement. For example, the inert portion can be made of polyetherether ketone (PEEK) or at least coated with a PEEK lining, which does not leach out a significant number of ions when exposed to a liquid.

An eluent is a liquid that contains an acid, base, salt, or mixture thereof and can be used to elute an analyte through a chromatography column. In addition, an eluent can include a mixture of a liquid and a water miscible organic solvent, where the liquid may include an acid, base, salt, or combination thereof. Electrolytic eluent generator 104 is configured to generate a generant. A generant refers to a particular species of acid, base, or salt that can be added to the eluent. In an embodiment, the generant may be a base such as cation hydroxide or the generant may be an acid such as carbonic acid, phosphoric acid, acetic acid, methanesulfonic acid, or a combination thereof.

Referring to FIG. 1, eluent generator 104 can be configured to receive the liquid from pump 102 and then add a generant to the liquid. The liquid containing the generant can be outputted from eluent generator 104 to an inlet of continuously regenerated trap column 106.

Continuously regenerated trap column 106 is configured to remove cationic or anionic contaminants from the eluent. Continuously regenerated trap column 106 can include an ion exchange bed with an electrode at the eluent outlet. An ion exchange membrane interface can separate the eluent from a second electrode and contaminate ions can be swept through the ion exchange membrane towards the second electrode. In various embodiments, anion removal can utilize an anion exchange bed with a cathode at the eluent outlet separated from an anode by an anion exchange membrane. Alternatively, cation removal can utilize a cation exchange bed with an anode at the eluent outlet separated from a cathode by a cation exchange membrane. The contaminate ions can be swept out of regenerated trap column 106 using a recycled liquid via a recycle line 124 that is downstream of degas assembly 108.

Degasser 108 may be used to remove residual gases in eluents. In an embodiment, a residual gas may be hydrogen and oxygen. Degasser 108 may include a tubing section that is gas permeable and liquid impermeable such as, for example, amorphous fluoropolymers or more specifically Teflon AF. The flowing liquid can be outputted from degasser 108 to sample injector 110 with a substantial portion of the gas removed. The gas can be swept out of degasser 108 using a recycled liquid via a recycle line 122 that is downstream of electrolytic suppressor 114. The recycled liquid containing the residual gas can also be outputted from degasser 108 and directed to the continuously regenerated trap column 106.

Sample Injector 110 can be used to inject a bolus of a liquid sample into an eluent stream. The liquid sample may include a plurality of chemical constituents (i.e., matrix components) and one or more analytes of interest.

Chromatographic separation column 112 can be used to separate various matrix components present in the liquid sample from the analyte(s) of interest. Typically, chromatographic separation column 112 may be in the form of a hollow cylinder that contains a packed stationary phase. As the liquid sample flows through chromatographic separation column 112, the matrix components and target analytes can have a range of retention times for eluting off of chromatographic separation column 112. Depending on the characteristics of the target analytes and matrix components, they can have different affinities to the stationary phase in chromatographic separation column 112. An output of chromatographic separation column 112 can be fluidically connected to the electrolytic suppressor 114.

Electrolytic suppressor 114 can be used to reduce eluent conductivity background and enhance analyte response through efficient exchange of eluent counterions for regenerant ions. Electrolytic suppressor 114 can include an anode chamber, a cathode chamber, and an eluent suppression bed chamber separated by ion exchange membranes. The anode chamber and/or cathode chamber can produce regenerate ions. The eluent suppression bed chamber can include a flow path for the eluent separated from the regenerant by an ion exchange barrier and eluent counterions can be exchanged with regenerate ions across the ion exchange barrier. The cathode chamber or anode chamber can be supplied a recycled liquid via a recycle line 120 that is downstream of conductivity detector 116. An output of electrolytic suppressor 114 can be fluidically connected to detector 116 to measure the presence of the separated chemical constituents of the liquid sample.

As illustrated in FIG. 1, the fluidic output of the eluent from detector 116 is recycled to electrolytic suppressor 114 via recycle line 120, the fluidic output of the electrolytic suppressor 114 is recycled to degasser 108 via recycle line 122, the fluidic output from degasser 108 is recycled to continuously regenerated trap column 106 via recycle line 124, and the fluidic output of the continuously regenerated trap column 106 flows to waste.

Detector 116 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 120 is not needed, detector 116 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 118, a timer, and a memory portion. In addition, the electronic circuit may include a power supply that are configured to apply a controlling signal, respectively. Microprocessor 118 can be used to control the operation of chromatography system 100. Microprocessor 118 may either be integrated into chromatography system 100 or be part of a personal computer that communicates with chromatography system 100. Microprocessor 118 may be configured to communicate with and control one or more components of chromatography system such as pump 102, eluent generator 104, sample injector 110, and detector 116. The memory portion may be used to store instructions to set the magnitude and timing of the current waveform with respect to the switching of sample injector 110 that injects the sample.

Figure 2:
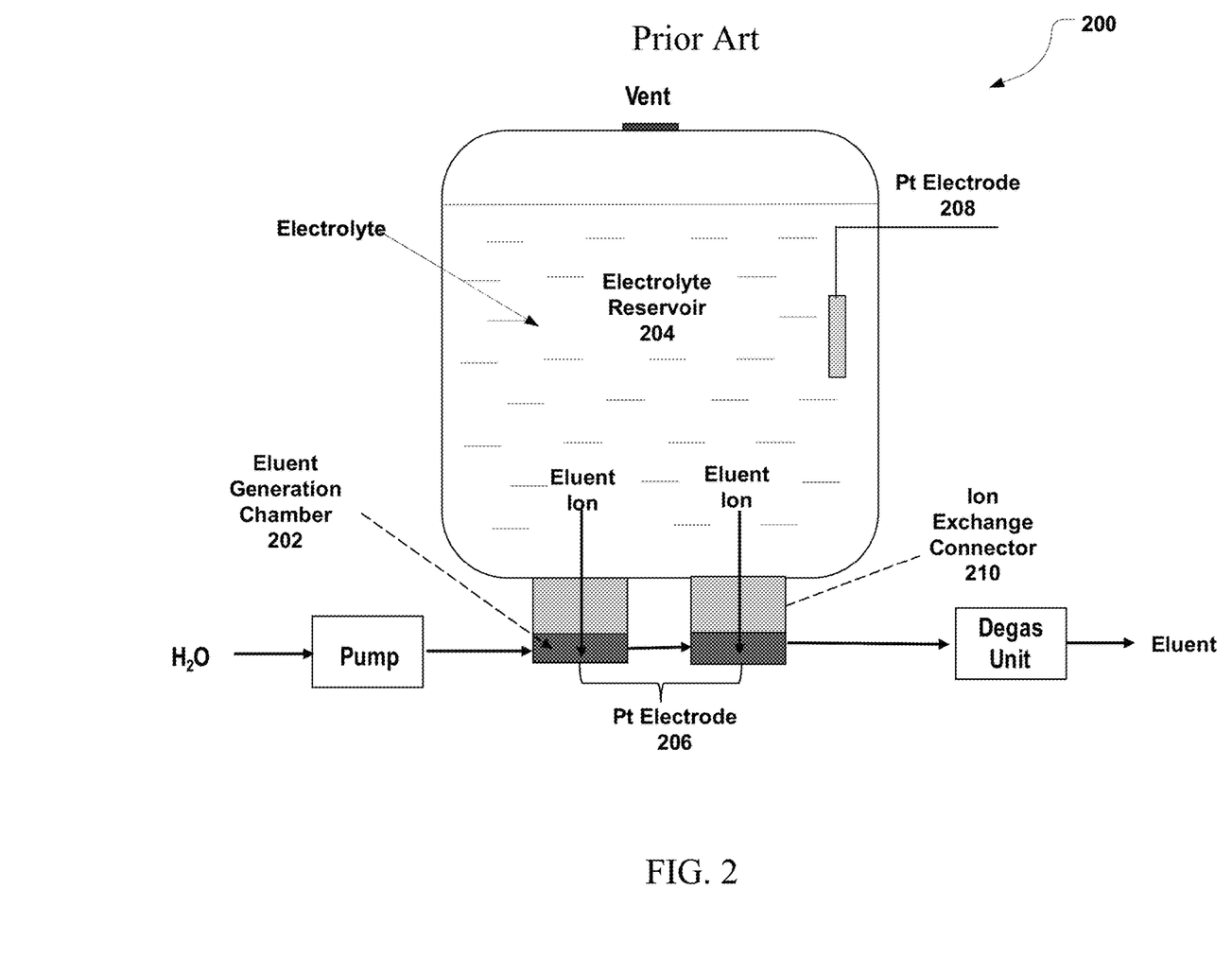
FIG. 2 illustrates an eluent generator, in accordance with various embodiments.

FIG. 2 illustrates the operation principle of an electrolytic eluent generator cartridge 200. The cartridge can include a high-pressure eluent generation chamber 202 and a low-pressure electrolyte reservoir 204. In various embodiments, the high-pressure generation chamber 202 can operate pressures greater than about 2,000 psi, such as at least about 5,000 psi, even at least about 10,000 psi, but not greater than about 30,000 psi, such as not greater than about 15,000 psi.

The eluent generation chamber 202 can contain a perforated platinum (Pt) electrode 206. The electrolyte reservoir 204 can contain a Pt electrode 208 and an electrolyte solution. In various embodiments, the electrolytic eluent generator cartridge 200 can produce a base, such as KOH, electrode 206 can be a cathode where hydroxide ions can be formed, and electrode 208 can be an anode. In other embodiments, the electrolytic eluent generator cartridge 200 can produce an acid, such as carbonic acid, phosphoric acid, acetic acid, methanesulfonic acid, electrode 206 can be an anode where hydronium ions can be formed, and electrode 208 can be a cathode. The eluent generation chamber 202 can be connected to the electrolyte reservoir 204 by means of an exchange connector 210 which can permit the passage of ions of only one charge from the electrolyte reservoir 204 into the high-pressure generation chamber 202. The exchange connector 210 can also serve the critical role of a high-pressure physical barrier between the low-pressure electrolyte reservoir 204 and the high-pressure generation chamber 202. In various embodiments, where the electrolytic eluent generator cartridge 200 is a base generator, the exchange connector 210 can permit the passage of cations while substantially preventing the passage of anions from the electrolyte reservoir 204 into the generation chamber 202. In alternate embodiments where the electrolytic generator cartridge 200 is an acid generator, the exchange connector 210 can permit the passage of anions while substantially preventing the passage of cations from the electrolyte reservoir 204 into the generation chamber 202.

In various embodiments, the eluent generation chamber 202 and the ion exchange connector 210 can be assembled into an eluent generation cartridge.

To generate a KOH eluent, deionized water can be pumped through the eluent generation chamber 202 and a DC current can be applied between the electrode 208 and electrode 206. Under the applied electric field, the electrolysis of water can occur at both the electrode 208 and electrode 206 of the cartridge 200. Water can be oxidized to form H+ ions and oxygen gas at electrode 208 in the electrolyte reservoir 204: $H_2O \rightarrow 2H+ + \frac{1}{2}O_2\uparrow + 2e-$. Water can be reduced to form OH-ions and hydrogen gas at electrode 206 in the KOH generation chamber 202: $2H_2O + 2e- \rightarrow 2\ OH- + H_2\uparrow$. As H+ ions, generated at the electrode 208, displaces K+ ions in the electrolyte reservoir 204, the displaced ions can migrate across the ion exchange connector 210 into the eluent generation chamber 202. These K+ ions can combine with hydroxide ions generated at the electrode 206 to produce the KOH solution, which can be used as the eluent for anion exchange chromatography. The concentration of generated KOH can be determined by the current applied to the generator cartridge 200 and the carrier water flow rate through the generation chamber 202.

To generate a methanesulfonic acid eluent, deionized water can be pumped through the eluent generation chamber 202 and a DC current can be applied between the electrode 208 and electrode 206. Under the applied field, the electrolysis of water can occur at both the electrode 208 and electrode 206 of the cartridge 200. Water can be oxidized to form H+ ions and oxygen gas at the electrode 206 in the KOH generation chamber 202: $H_2O \rightarrow 2H+ + \frac{1}{2} O_2\uparrow + 2e-$. Water can be reduced to form OH-ions and hydrogen gas at the electrode 208 in the electrolyte reservoir 204: $2H_2O + 2e- \rightarrow 2 OH- + H_2\uparrow$. As OH- ions, generated at the electrode 208, displaces methanesulfonate ions in the electrolyte reservoir 204, the displaced ions can migrate across the ion exchange connector 210 into the eluent generation chamber 202. These methanesulfonate ions can combine with hydronium ions generated at the electrode 206 to produce the methanesulfonic acid solution, which can be used as the eluent for cation exchange chromatography. The concentration of generated methanesulfonic acid can be determined by the current applied to the generator cartridge 200 and the carrier water flow rate through the generation chamber 202.

Stacked ion exchange membranes are the heart of electrolytic eluent generators. To generate pure eluents on-line for ion chromatography, both physical and chemical properties of the membranes are critical for the quality and the performance of the electrolytic eluent generators. Beyond these two, there is another key factor: the stacked membrane continuity that determines the operational voltage when a constant current is applied on an electrolytic eluent generator. The membrane continuity issue can occur during EGC assembly and operation, resulting in poor production yield and unsatisfactory performance due to the over-voltage problem. Herein is disclosed a new configuration consisting of a top membrane washer and a disk-containing spacer to resolve the challenges encountered from high torque force during assembly and applications under high pressure conditions. This novel configuration can be utilized to overcome the over-voltage problem during cartridge assembly with a high-torque force application. Furthermore, this configuration can be used to assemble EGC KOH and MSA cartridges successfully and enable these cartridges capable of generating pure eluents electrolytically under an ultra-high pressure.

Figure 3A:
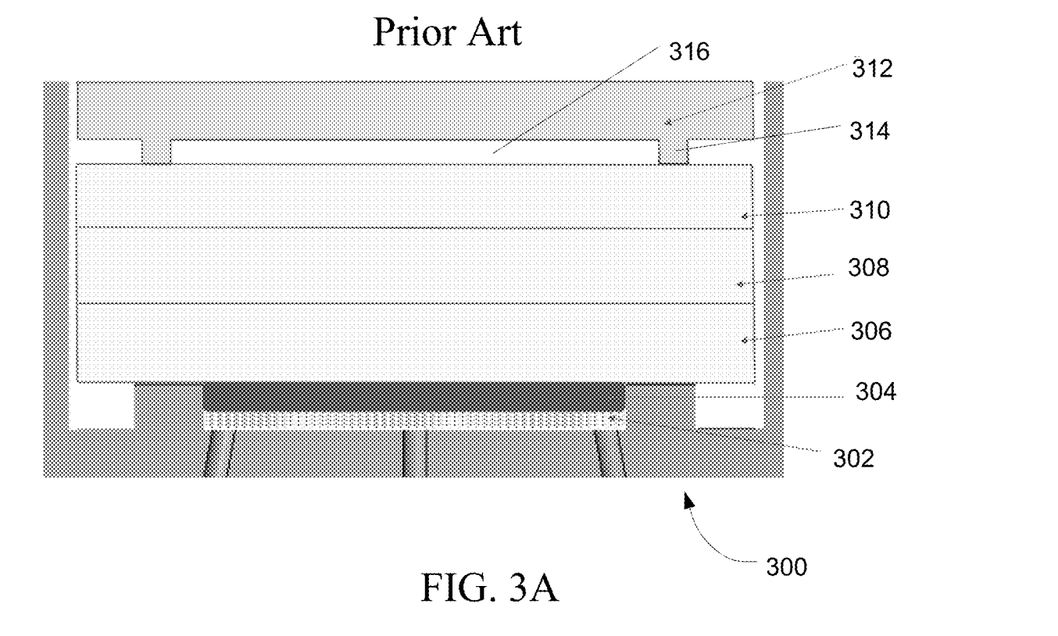
FIGS. 3A and 3B illustrate an eluent generation cartridge, in accordance with various embodiments.
Figure 3B:
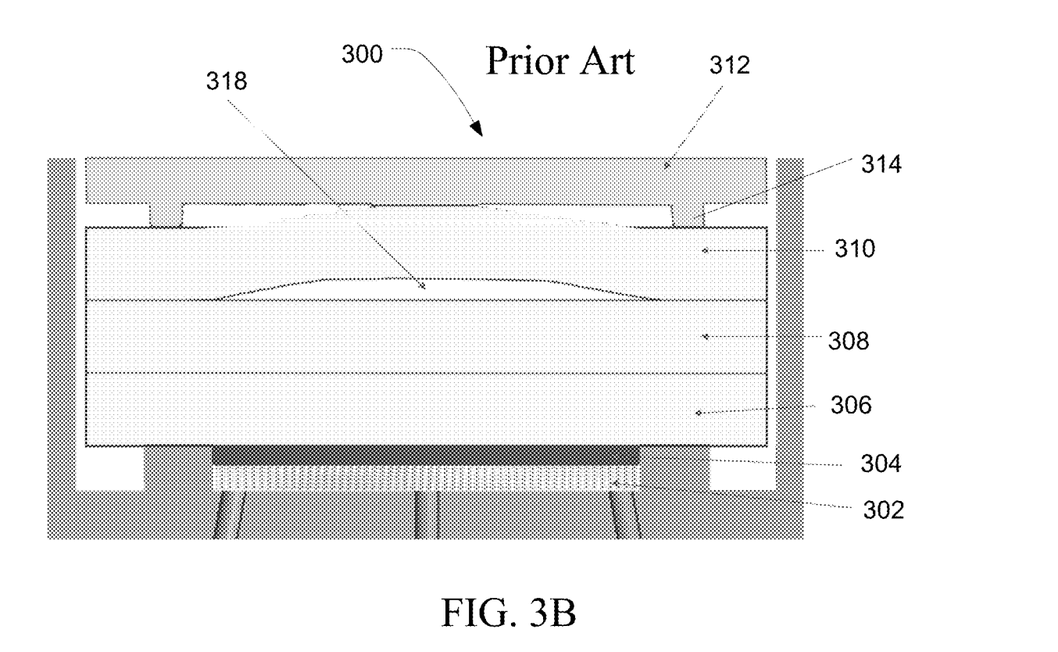

FIGS. 3A and 3B illustrate an eluent generation cartridge 300. The eluent generation cartridge 300 can include a platinum mesh electrode 302, a polymer screen 304, a plurality of ion exchange membrane stacks 306, 308, and 310, and a spacer 312. Spacer 312 includes an annular projection 314 that forms a seal with ion exchange membrane 310 while allowing the electrolyte solution to contact ion exchange membrane 310 in the space 316 inside the annual projection 314.

The plurality of ion exchange membranes 306, 308, and 310 are compressed by the spacer 312. A torque force is applied onto a compression bolt (not shown). Then, the compression force is transferred to the ion exchange membranes 306, 308, and 310 through the spacer 312, and the spacer 312 with the annular projection 314 near the perimeter is pushed down for seal. The compression of the membranes 306, 308, and 310 by the annular projection 314 results in a membrane deformation, as shown in FIG. 3B. The deformation varies from the perimeter to the center. The membrane near the center is deformed the most, which can cause the entire membrane 310 to bulge into space 316, creating a void 318 between membranes 308 and 310. The membrane deformation can be small for a moderate torque force, with a negligible impact on the stacked membranes continuity during assembly and operation. However, when a high torque force is required for ultra-high pressure EEG cartridges, the membrane discontinuity during the torque process can become an issue. The void formed during compression for ultra high pressure can lead to an electrical discontinuity resulting in voltage spikes and increased resistance.

Figure 4A:
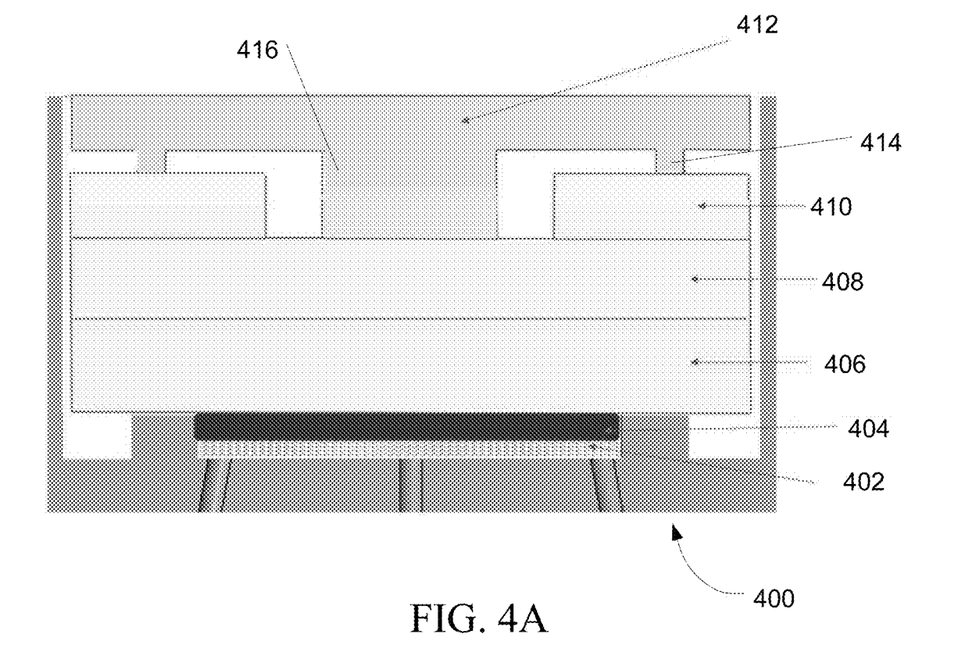
FIGS. 4A and 4B illustrate an improved eluent generation cartridge, in accordance with various embodiments.
Figure 4B:
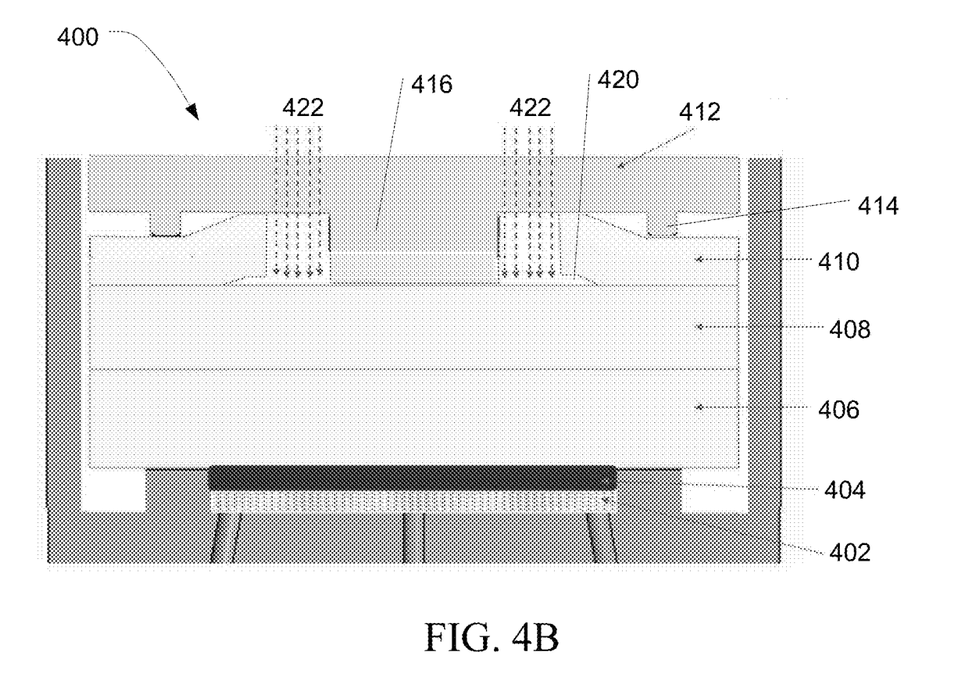

FIGS. 4A and 4B illustrate an eluent generation cartridge 400. The eluent generation cartridge 400 can include a platinum mesh electrode 402, a polymer screen 404, a plurality of ion exchange membrane stacks 406 and 408, a membrane washer 410, and a spacer 412. Spacer 412 includes an annular projection 414, similar to spacer 312, and a central post 416. The electrolyte solution can contact membrane stack 408 and membrane washer 410 in the annular space 418 between the annular projection 414 and the central post 416.

In various embodiments, the plurality of ion exchange membrane stacks 406 and 408 can include a number of ion exchange membranes, at least a portion of which can be reinforced membranes. In various embodiments, the total number of ion exchange membranes, including reinforced and non-reinforced ion exchange membranes, can be at least about 5 ion exchange membranes. Generally, the ion exchange membrane stacks 406 and 408 together may include not greater than about 100 ion exchange membranes.

In various embodiments, the membrane washer 410 can include one or more ion exchange membranes. Generally, the membrane washer 410 may include not more than about 20 ion exchange membranes.

As shown in FIG. 4B, the membrane washer 410 can deform into the annular space 418 during compression forming a gap 420 between membrane washer 410 and ion exchange membrane 408. However, the electrolyte solution 422 can flow into the gap 420, avoiding the discontinuity seen in the embodiment shown in FIGS. 3A and 3B.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. An eluent generation cartridge comprising:
    a platinum mesh electrode;
    a polymer screen;

a plurality of reinforced membranes;
a membrane washer including at least one ion exchange membrane; and
a spacer including a central post and an annular projection,
wherein the membrane washer is deformable into an annular space between the annular projection and the central post during compression such that a gap is formed between the membrane washer and the adjacent ion exchange membrane.

2. The eluent generation cartridge of claim 1 wherein the eluent generation cartridge is configured to operate at a pressure of at least about 5,000 psi.

3. The eluent generation cartridge of claim 2 wherein the eluent generation cartridge is configured to operate at a pressure of at least about 10,000 psi.

4. The eluent generation cartridge of claim 2 wherein the eluent generation cartridge is configured to operate at a pressure of not greater than about 30,000 psi.

5. The eluent generation cartridge of claim 4 wherein the eluent generation cartridge is configured to operate at a pressure of not greater than about 15,000 psi.

6. The eluent generation cartridge of claim 1 wherein the plurality of reinforced membranes includes at least 5 ion exchange membranes.

7. The eluent generation cartridge of claim 6 wherein the plurality of reinforced membranes includes not more than about 100 ion exchange membranes.

8. The eluent generation cartridge of claim 1 wherein the membrane washer includes not more than about 20 ion exchange membranes.

9. An electrolytic eluent generator comprising:
an electrolyte reservoir including:
  a chamber containing an aqueous electrolyte solution; and
  a first electrode:
at least one eluent generation cartridge including:
  a platinum mesh electrode;
  a polymer screen:
  a plurality of reinforced membranes;
  a membrane washer including at least one ion exchange membrane; and
  a spacer including a central post and an annular projection,
  wherein the membrane washer is deformable into an annular space between the annular projection and the central post during compression such that a gap is formed between the membrane washer and the adjacent ion exchange membrane.

10. The electrolytic eluent generator of claim 9 wherein the eluent generation cartridge is configured to operate at a pressure of at least about 5,000 psi.

11. The electrolytic eluent generator of claim 10 wherein the eluent generation cartridge is configured to operate at a pressure of at least about 10,000 psi.

12. The electrolytic eluent generator of claim 10 wherein the eluent generation cartridge is configured to operate at a pressure of not greater than about 30,000 psi.

13. The electrolytic eluent generator of claim 12 wherein the eluent generation cartridge is configured to operate at a pressure of not greater than about 15,000 psi.

14. The electrolytic eluent generator of claim 9 wherein the aqueous electrolyte solution includes potassium hydroxide or sodium hydroxide.

15. The electrolytic eluent generator of claim 9 wherein the aqueous electrolyte solution includes methanesulfonic acid.

16. The electrolytic eluent generator of claim 9 wherein the plurality of reinforced membranes includes at least 5 ion exchange membranes.

17. The electrolytic eluent generator of claim 16 wherein the plurality of reinforced membranes includes not more than about 100 ion exchange membranes.

18. The electrolytic eluent generator of claim 9 wherein the membrane washer includes not more than about 20 ion exchange membranes.

* * * * *

UNITED STATES PATENT AND TRADEMARK OFFICE
CERTIFICATE OF CORRECTION

PATENT NO. : 12,247,307 B2
APPLICATION NO. : 17/565643
DATED : March 11, 2025
INVENTOR(S) : Zhongqing Lu et al.

Page 1 of 1

It is certified that error appears in the above-identified patent and that said Letters Patent is hereby corrected as shown below:

In the Claims

In Column 9, Line 36, Claim 9, delete "electrode:" and insert -- electrode; --, therefor.

In Column 9, Line 39, Claim 9, delete "screen:" and insert -- screen; --, therefor.

Signed and Sealed this
Twenty-second Day of April, 2025

Coke Morgan Stewart
*Acting Director of the United States Patent and Trademark Office*